United States Patent
Hashisho

(10) Patent No.: US 10,429,195 B2
(45) Date of Patent: Oct. 1, 2019

(54) METHOD, APPARATUS, AND COMPUTER PROGRAM PRODUCT FOR GENERATION OF A ROUTE USING TIME AND SPACE

(71) Applicant: HERE Global B.V., Eindhoven (NL)

(72) Inventor: Basel Hashisho, Berlin (DE)

(73) Assignee: HERE Global B.V., Eindhoven (NL)

(*) Notice: Subject to any disclaimer, the term of this patent is extended or adjusted under 35 U.S.C. 154(b) by 42 days.

(21) Appl. No.: 15/708,834

(22) Filed: Sep. 19, 2017

(65) Prior Publication Data
US 2019/0086219 A1    Mar. 21, 2019

(51) Int. Cl.
*G01C 21/34* (2006.01)
*G01C 21/20* (2006.01)
*G05D 1/02* (2006.01)

(52) U.S. Cl.
CPC ......... *G01C 21/3415* (2013.01); *G01C 21/20* (2013.01); *G01C 21/3492* (2013.01); *G05D 1/0223* (2013.01)

(58) Field of Classification Search
CPC ............ G01C 21/3415; G01C 21/3492; G01C 21/20; G05D 1/0223
USPC ........................................................ 701/414
See application file for complete search history.

(56) References Cited

U.S. PATENT DOCUMENTS

| | | |
|---|---|---|
| 8,103,435 B2 | 1/2012 | Yang et al. |
| 2012/0158301 A1 | 6/2012 | Schilling et al. |
| 2013/0110392 A1 | 5/2013 | Kosseifi et al. |
| 2018/0023971 A1* | 1/2018 | Konig ............... G01C 21/3415 701/533 |

FOREIGN PATENT DOCUMENTS

| | | |
|---|---|---|
| WO | WO 2013/154901 A1 | 10/2013 |
| WO | WO 2017/089600 A1 | 6/2017 |

OTHER PUBLICATIONS

Hamerslag, Rudi, *Dynamic Assignment in Three-Dimensional Time Space*, Transportation Research Record 1220, [retrieved Mar. 21, 2018]. Retrieved from the Internet: <URL: http://onlinepubs.trb.org/Onlinepubs/trr/1989/1220/1220-004.pdf>. (1989) 28-32.

(Continued)

*Primary Examiner* — Brian P Sweeney
(74) *Attorney, Agent, or Firm* — Alston & Bird LLP

(57) ABSTRACT

A method is provided for generating a route from an origin to a destination factoring in the time dimension. Methods may include: receiving an indication of an origin and a destination; determining potential routes from the origin to the destination, where each route includes a sequence of nodes with road segments in between; determining, for each sequence of nodes, an anticipated time at which point each node in the sequence would be reached by a vehicle traveling along the respective route; determining, for each sequence of nodes, the availability of each node in the sequence at the anticipated time each node in the sequence would be reached; and establishing a recommended route between the origin and the destination according to the availability of each of the sequence of nodes in the sequence at the time each node in the sequence would be reached.

27 Claims, 6 Drawing Sheets

(56) References Cited

OTHER PUBLICATIONS

Liu, R. et al., *Themis: A Participatory Navigation System for Balanced Traffic Routing*, [retrieved Mar. 21, 2018]. Retrieved from the Internet: <URL: https://web.njit.edu/~borcea/papers/ieee-vnc14.pdf>. (2014) 8 pages.

Tatomir, B. et al., *Travel Time Prediction for Dynamic Routing Using Ant Based Control*, Proceedings of the 2009 Winter Simulation Conference, IEEE (2009) 1069-1078.

Wilkie, D. et al., *Self-Aware Traffic Route Planning*, Proceedings of the Twenty-Fifth AAAI Conference on Artificial Intelligence, (2011) 1521-1527.

International Search Report and Written Opinion for Application No. PCT/EI2018/075084 dated Jan. 7, 2019, 13 pages.

\* cited by examiner

METHOD, APPARATUS, AND COMPUTER PROGRAM PRODUCT FOR GENERATION OF A ROUTE USING TIME AND SPACE

TECHNOLOGICAL FIELD

An example embodiment of the present invention relates to the generation of a route from an origin to a destination, and more particularly, to the generation of a route from an origin to a destination factoring in the time dimension in order to optimize a route among a plurality of routes within the same network of roads, and in consideration of other routes of other vehicles along the same road network.

BACKGROUND

Maps have been used for centuries for providing route geometry and geographical information. Conventional paper maps including static images of roadways and geographic features from a snapshot in history have given way to digital maps presented on computers and mobile devices. Navigating a network of roads is made easier through maps, and particularly digital maps which enable a user to view their location on a map while navigating the roads. Further, route guidance may be provided by navigation systems for a use to navigate through the network of roads to reach a destination. Typically, route guidance may be provided to a user according to the shortest distance to a destination, or a fastest time to a destination. However, these routes may become congested with traffic. Navigation systems may use traffic data to determine when congestion occurs, and provide routes around the congestion, but these revised routes may then become congested from the rerouted traffic.

BRIEF SUMMARY

A method, apparatus, and computer program product are provided in accordance with an example embodiment for generation of a route from an origin to a destination factoring in the time dimension in order to optimize a route among a plurality of routes within the same network of road, and in consideration of other routes of other vehicles along the same road network. Embodiments may provide a mapping system including a memory having map data, where the map data includes a network of road segments and nodes between road segments. The system may include processing circuitry configured to: receive an indication of an origin and a destination; determine potential routes from the origin to the destination, where each route includes a sequence of nodes with road segments in between; determine, for each sequence of nodes, an anticipated time at which point each node in the sequence would be reached by a vehicle traveling along the respective route; determine, for each sequence of nodes, the availability of each node in the sequence at the time each node in the sequence would be reached; and provide an instruction to follow the established route. The availability of a node includes a window of time in which no vehicle is determined to or scheduled to occupy the node. The window of time for a node may be of a predetermined length, where the predetermined length is established based on one or more of road topology at the node, intersection topology at the node, traffic light duration of the node, traffic control device of the node, maneuver complexity of the established recommended route at the node, or vehicle specifications of a vehicle traveling along the established route.

The processing circuitry of some embodiments may be configured to: monitor availability of each node in the established recommended route; determine, for at least one node, a change in the availability affecting the availability of the respective node in the sequence at the anticipated time the node would be reached; and provide an instruction to either increase speed or decrease speed in response to the change in availability of the respective node. The processing circuitry may optionally be configured to: monitor progress of a vehicle along the established recommended route; determine an estimated time of arrival at a next node in the sequence of nodes of the established recommended route based on vehicle information; determine if the estimated time of arrival at a next node in the sequence of the established recommended route corresponds to the anticipated time for the corresponding node; and provide an instruction to either increase speed or decrease speed in response to the estimated time of arrival at the next node not corresponding to the anticipated time for the corresponding node.

According to some embodiments, the processing circuitry may be configured to: monitor the availability of each node of the established recommended route; determine, for at least one node, a change in availability of the respective node in the sequence at the anticipated time the node would be reached; determine potential routes from a current location to the destination, where each route includes a sequence of nodes; determine, for each sequence of nodes, an anticipated time at which point each node in the sequence would be reached; determine, for each sequence of nodes, the availability of each node in the sequence at the anticipated time each node in the sequence would be reached; establish a revised recommended route between the current location and the destination according to the availability of each of the sequence of nodes in the sequence at the time the node would be reached; and provide an instruction to follow the established revised recommended route. In response to establishing the revised recommended route from the current location to the destination, a node that was in the recommended route between the origin and the destination, but not in the revised recommended route between the current location and the destination is released to increase the availability of the node at the anticipated time the node in the sequence of the recommended route would have been reached.

According to some embodiments, the processing circuitry may optionally be configured to cause a decrease in the availability of each node in the sequence of nodes of the recommended route between the origin and the destination at the anticipated time at which each node in the sequence would be reached. The processing circuitry configured to establish a recommended route between the origin and the destination according to the availability of each of the sequence of nodes in the sequence at the time each node in the sequence would be reached may include processing circuitry configured to: evaluate availability of each node in a sequence for a route; and in response to a given node having no availability at the anticipated time the corresponding node would be reached, changing at least one node earlier in the sequence than the given node having no availability to a different node to at least one of: change the anticipated time the given node would be reached to a time at which the node would have availability; or avoid the given node.

Embodiments described herein may provide an apparatus including at least one processor and at least one memory including computer program code. The at least one memory and the computer program code configured to, with the processor, cause the apparatus to at least: receive an indication of an origin and a destination; determine potential routes from the origin to the destination, where each route includes a sequence of nodes with road segments in between; determine, for each sequence of nodes, an anticipated time at which point each node in the sequence would be reached by a vehicle traveling along the respective route; determine, for each sequence of nodes, the availability of each node in the sequence at the anticipated time each node in the sequence would be reached; establish a recommended route between the origin and the destination according to the availability of each of the sequence of nodes in the sequence at the time each node in the sequence would be reached; and provide an instruction to follow the established recommended route. The availability of a node may include a window of time in which no vehicle is determined to or scheduled to occupy the node. The window of time for a node may be of a predetermined length, where the predetermined length may be established based on one or more of: road topology at the node; intersection topology at the node; traffic light duration at the node; traffic control device at the node; maneuver complexity of the established recommended route at the node; or vehicle specifications of a vehicle traveling along the established route.

According to some embodiments, the apparatus may further be caused to: monitor availability of each node of the established recommended route; determine, for at least one node, a change in the availability affecting the availability of the respective node in the sequence at the anticipated time the node would be reached; and provide an instruction to either increase speed or decrease speed in response to the change in the availability of the respective node. The apparatus of some embodiments may optionally be caused to: monitor progress of a vehicle along the established recommended route; determine an estimated time of arrival at a node in the sequence of nodes of the established recommended route based on vehicle information; determine if the estimated time of arrival at a next node in the sequence of the established recommended route corresponds to the anticipated time for the corresponding node; and provide an instruction to either increase speed or decrease speed in response to the estimated time of arrival at the next node not corresponding to the anticipated time for the corresponding node.

Embodiments of the apparatus may be caused to: monitor availability of each node of the established recommended route; determine, for at least one node, a change in the availability affecting the availability of the respective node in the sequence at the anticipated time the node would be reached; determine potential routes from a current location to the destination, where each route includes a sequence of nodes; determine, for each sequence of nodes, an anticipated time at which point each node in the sequence would be reached; determine, for each sequence of nodes, the availability of each node in the sequence at the anticipated time each node in the sequence would be reached; establish a revised recommended route between the current location and the destination according to the availability of each of the sequence of nodes in the sequence at the time each node in the sequence would be reached; and provide instruction to follow the established revised recommended route. In response to establishing a revised recommended route from the current location to the destination, release a node that was in the recommended route between the origin and the destination but not in the revised route between the current location and the destination to increase the availability of the node at the anticipated time the node in the sequence of the recommended route would have been reached.

The apparatus of example embodiments may be caused to decrease the availability of each node in the sequence of nodes of the recommended route between the origin and the destination at the anticipated time at which each node in the sequence would have been reached. Causing the apparatus to establish a recommended route between the origin and the destination according to the availability of each of the sequence of nodes in the sequence at the time each node in the sequence would be reached may include causing the apparatus to: evaluate availability of each node in a sequence for a route; and in response to a given node having no availability at the anticipated time the corresponding node would have been reached, changing at least one node earlier in the sequence than the given node having no availability to a different node to at least one of: change the anticipated time the given node would be reached to a time at which the node would have availability; or avoid the given node.

Embodiments described herein may provide a method including: receiving an indication of an origin and a destination; determining potential routes from the origin to the destination, where each route includes a sequence of nodes with road segments in between; determining, for each sequence of nodes, an anticipated time at which point each node in the sequence would be reached by a vehicle traveling along the respective route; determining, for each sequence of nodes, the availability of each node in the sequence at the anticipated time each node in the sequence would be reached; establishing a recommended route between the origin and the destination according to the availability of each of the sequence of nodes in the sequence at the time each node in the sequence would be reached; and providing instruction to follow the established route. The availability of a node may include a window of time in which no vehicle is determined to or scheduled to occupy the node. The window of time for a node may be of a predetermined length, where the predetermined length is established based on one or more of: road topology at the node; intersection topology at the node; traffic light duration at the node; traffic control device at the node; maneuver complexity of the established recommended route at the node; or vehicle specifications of a vehicle traveling along the established recommended route.

Methods of example embodiments may include: monitoring availability of each node of the established recommended route; determining, for at least one node, a change in the availability affecting the availability of the respective node in the sequence at the anticipated time the node would be reached; and providing an instruction to either increase speed or decrease speed in response to the change in the availability of the respective node. Methods may optionally include: monitoring progress of a vehicle along the established recommended route; determining an estimated time of arrival at a next node in the sequence of nodes of the established recommended route based on vehicle information; determining if the estimated time of arrival at a next node in the sequence of the established recommended route corresponds to the anticipated time for the corresponding node; and providing an instruction to either increase speed or decrease speed in response to the estimated time of arrival at the next node not corresponding to the anticipated time for the corresponding node.

According to some embodiments, methods may include: monitoring availability of each node of the established recommended route; determining, for at least one node, a change in the availability affecting the availability of the respective node in the sequence at the anticipated time the node would be reached; determining potential routes from a current location to the destination, where each route includes a sequence of nodes; determining, for each sequence of nodes, an anticipated time at which point each node in the sequence would be reached; determining, for each sequence of nodes, the availability of each node in the sequence at the anticipated time each node in the sequence would be reached; establishing a revised recommended route between the current location and the destination according to the availability of each of the sequence of nodes in the sequence at the time each node in the sequence would be reached; and providing an instruction to follow the established revised recommended route. In response to establishing a revised recommended route from the current location to the destination, releasing a node that was in the recommended route between the origin and the destination, but not in the revised route between the current location and the destination to increase the availability of the node at the anticipated time the node in the sequence of the recommended route would have been reached.

According to some embodiments, methods may include causing a decrease in the availability of each node in the sequence of nodes of the recommended route between the origin and the destination at the anticipated time at which each node in the sequence would be reached. Establishing a recommended route between the origin and the destination according to the availability of each of the sequence of nodes in the sequence at the time each node in the sequence would be reached includes: evaluating availability of each node in a sequence for a route; and in response to a given node having no availability at the anticipated time the corresponding node would have been reached, changing at least one node earlier in the sequence than the given node having no availability to a different node to at least one of: change the anticipated time the given node would be reached to a time at which the node would have availability; or avoid the given node.

BRIEF DESCRIPTION OF THE DRAWINGS

Figure 1:
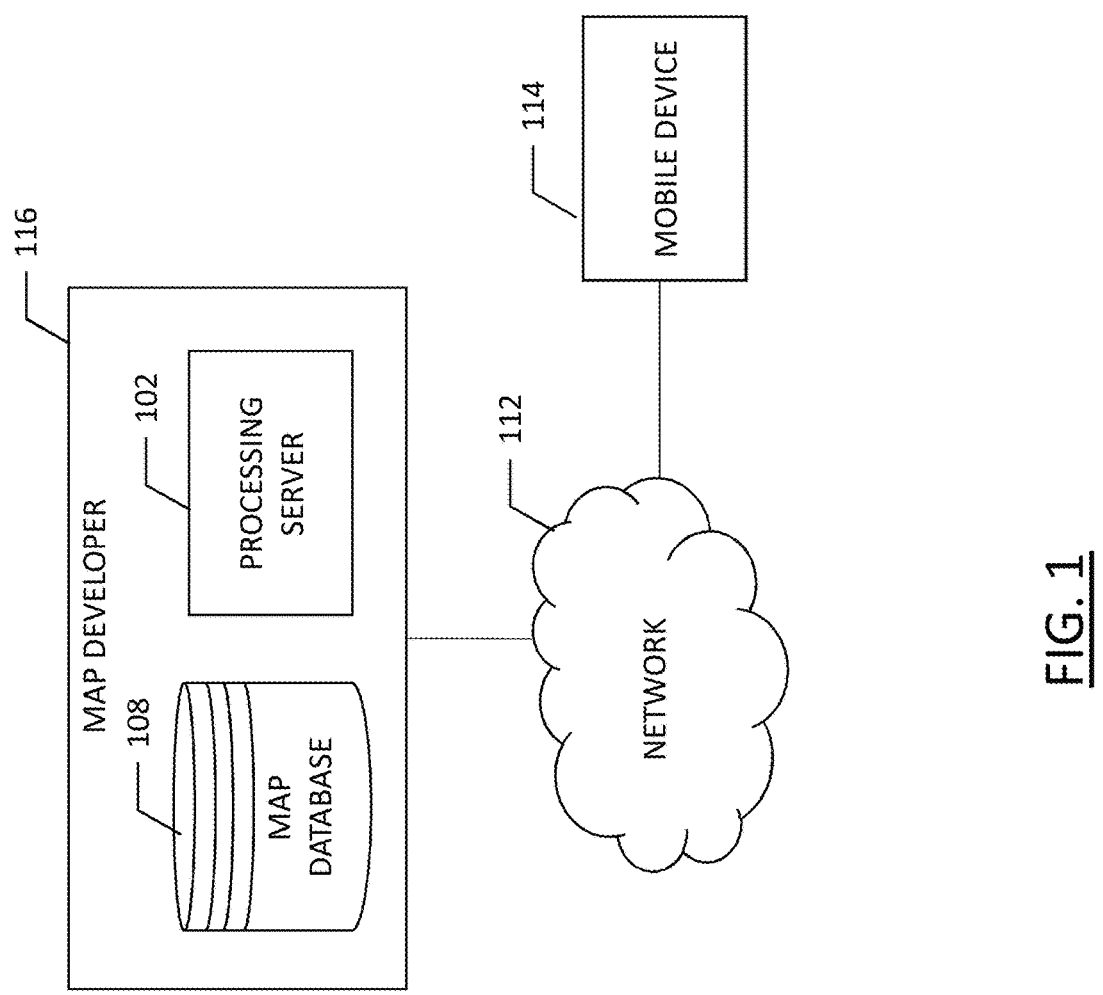
Figure 2:
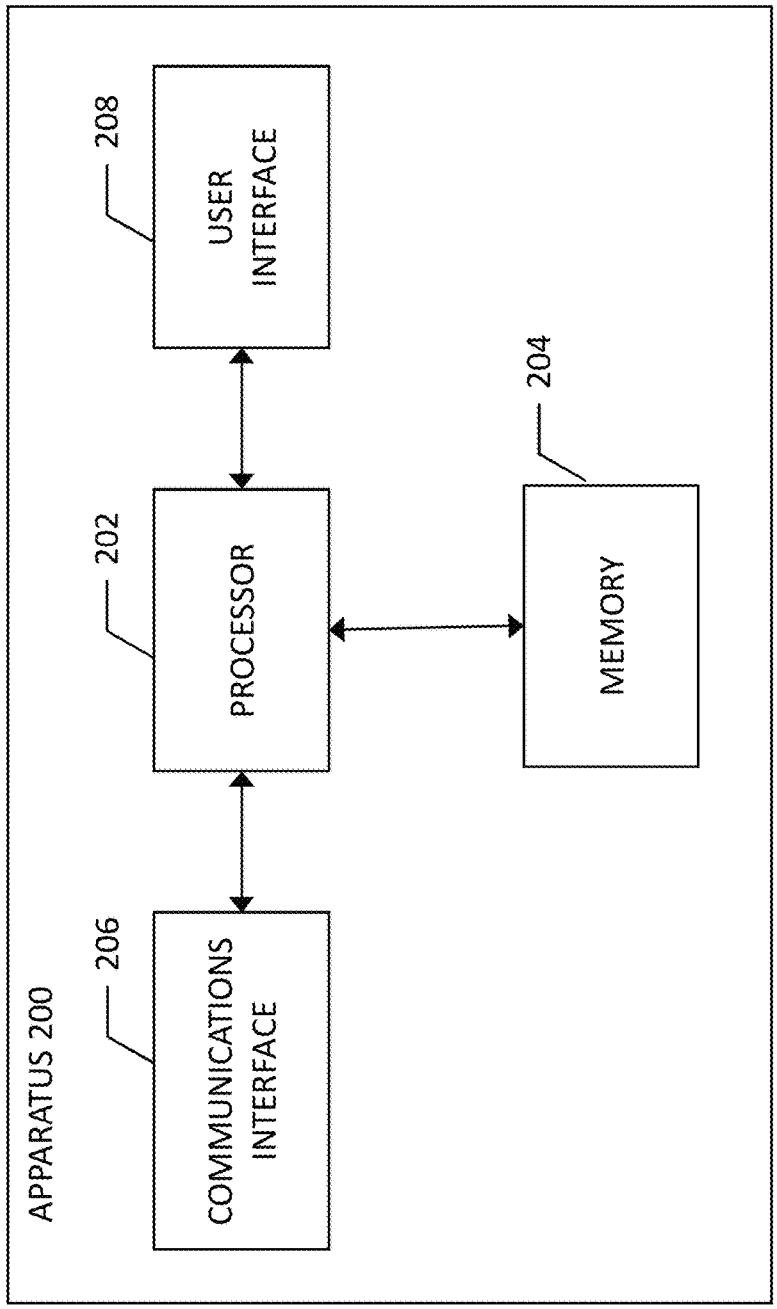
Figure 3:
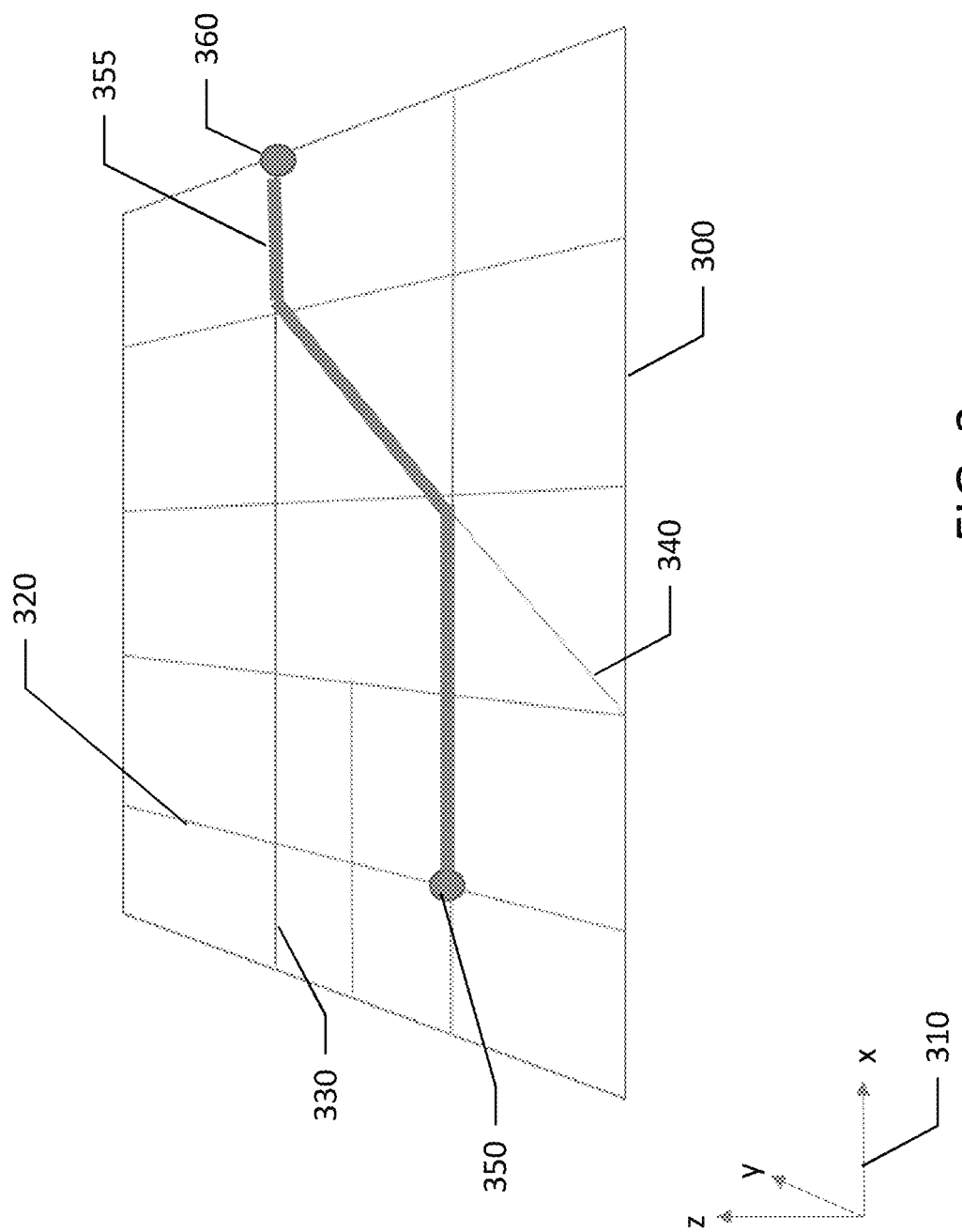
Figure 4:
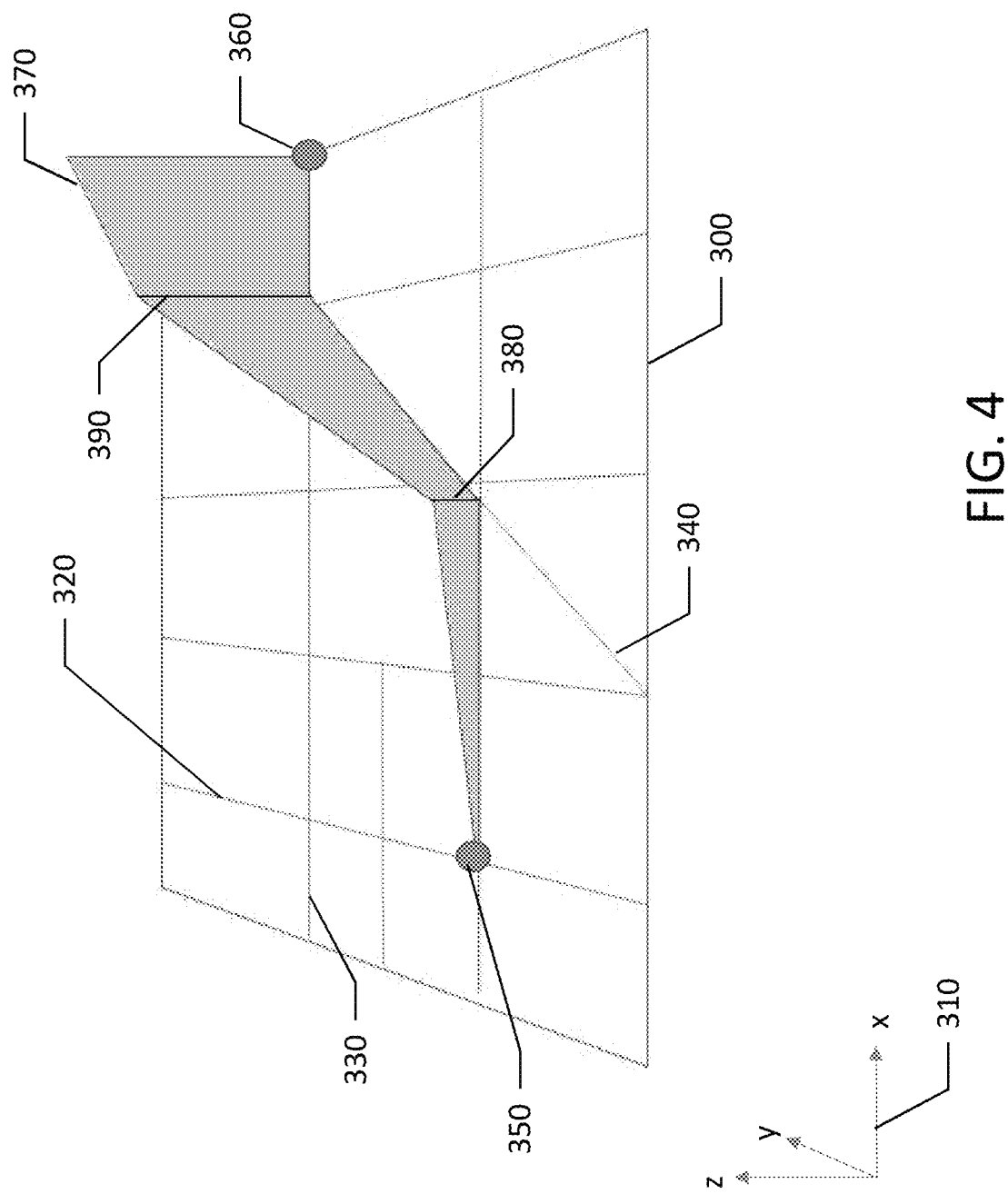
Figure 5:
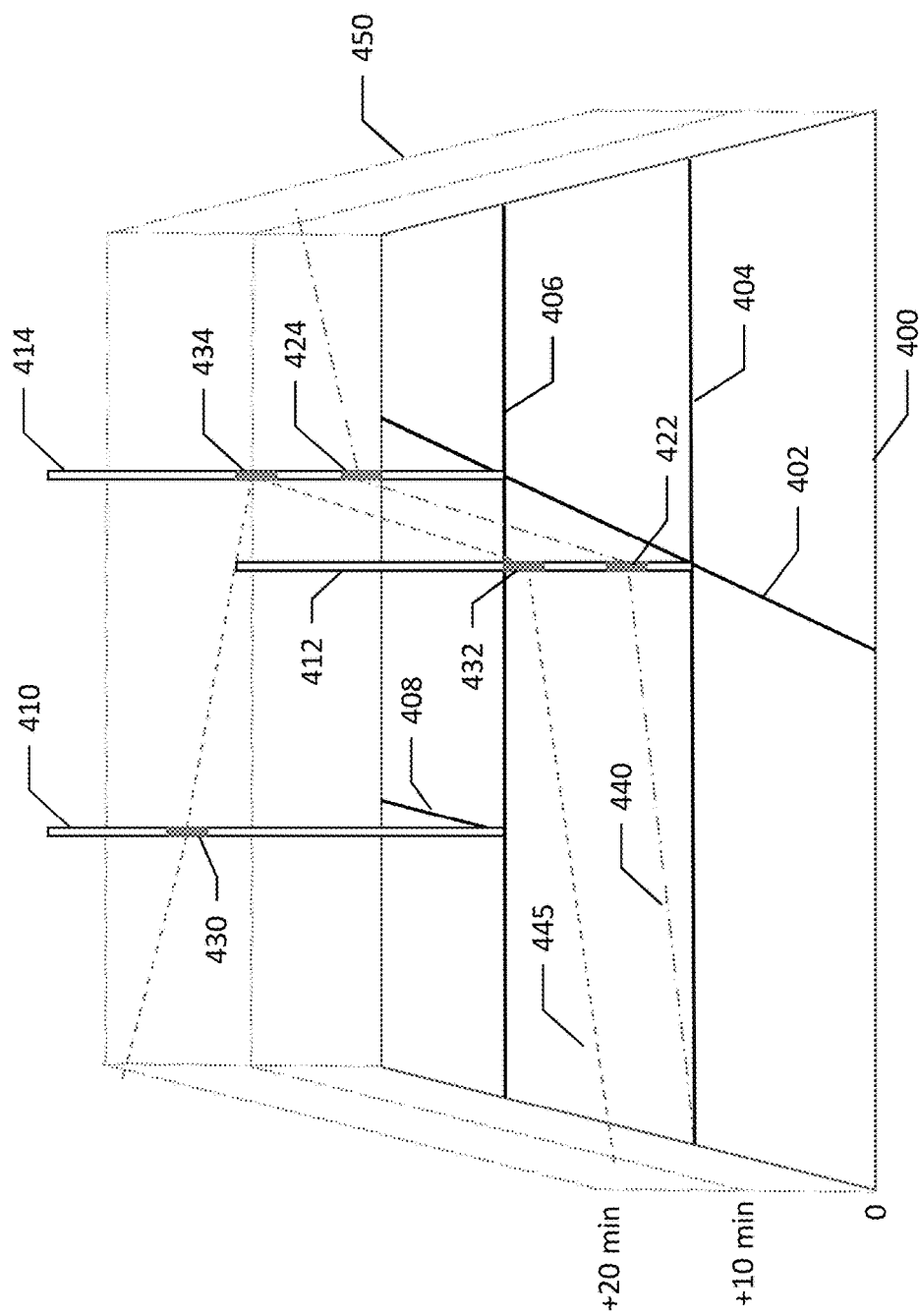
Figure 6:
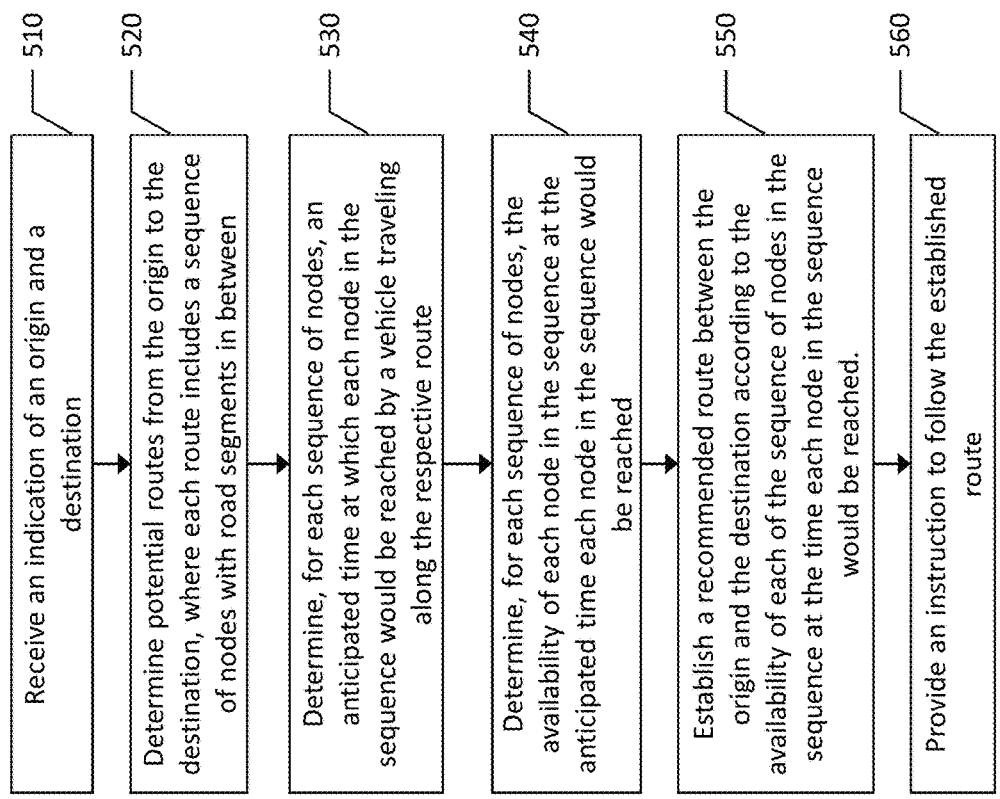

Having thus described example embodiments of the invention in general terms, reference will now be made to the accompanying drawings, which are not necessarily drawn to scale, and wherein:

FIG. 1 illustrates a communications diagram in accordance with an example embodiment of the present invention;

FIG. 2 is a block diagram of an apparatus that may be specifically configured for time and space based route planning accordance with an example embodiment of the present invention;

FIG. 3 illustrates a two-dimensional mapped route according to an example embodiment of the present invention;

FIG. 4 illustrates a three-dimensional mapped route including a third dimension in the time domain according to an example embodiment of the present invention;

FIG. 5 illustrates and a three-dimensional map representation of a network of roads including time-poles shown at each intersection according to an example embodiment of the present invention; and FIG. 6 illustrates a flowchart depicting a method for generation of a route from an origin to a destination factoring in the time dimension in order to optimize a route among a plurality of routes within the same network of road, and in consideration of other routes of other vehicles along the same road network according to another example embodiment of the present invention;

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus, and computer program product are provided herein in accordance with an example embodiment for time and space based route planning that facilitates traffic balancing. FIG. 1 illustrates a communication diagram of an example embodiment of a system for implementing example embodiments described herein. The illustrated embodiment of FIG. 1 includes a map developer system 116, a processing server 102 in data communication a geographic map database, e.g., map database 108 through a network 112, and one or more mobile devices 114. The mobile device 114 may be associated, coupled, or otherwise integrated with a vehicle, such as an in-dash vehicle navigation unit, a vehicle head unit, electronic control unit, or an advanced driver assistance system (ADAS), for example. Additional, different, or fewer components may be provided. For example, many mobile devices 114 may connect with the network 112. The map developer 116 may include computer systems and network of a system operator. The processing server 102 may include the map database 108, such as a remote map server. The network may be wired, wireless, or any combination of wired and wireless communication networks, such as cellular, Wi-Fi, internet, local area networks, or the like.

Embodiments described herein may be implemented in autonomous, semi-autonomous, or non-autonomous vehicles. Autonomous vehicles may include vehicles that are driven entirely by software and hardware components, without requiring human interaction. Non-autonomous vehicles are vehicles that have no autonomy and require a human driver to perform all driving activities. Semi-autonomous vehicles are vehicles that fall anywhere between autonomous and non-autonomous vehicles, where there is some degree of autonomy, which may include any form of driver aid such as steering assistance, acceleration/deceleration assistance, adaptive cruise control, etc.

Processing server 102 may be one or more fixed or mobile computing devices. The mobile device 114 may be configured to access the map database 108 via the processing server 102 through, for example, a mapping application, such that the user equipment may provide navigational assistance to a user among other services provided through access to the map developer 116.

The map database 108 may include node data, road segment data or link data, point of interest (POI) data, or the like. The map database 108 may also include cartographic data, routing data, and/or maneuvering data. According to some example embodiments, the road segment data records may be links or segments representing roads, streets, or paths, as may be used in calculating a route or recorded route information for determination of one or more personalized routes. The links or roadways may be represented by polylines, where each polyline comprises a plurality of vertices establishing the path of the roadway geometry. The node data may be end points corresponding to the respective links or segments of road segment data. The road link data and the node data may represent a road network, such as used by vehicles, cars, trucks, buses, motorcycles, and/or other entities. Optionally, the map database 108 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 108 can include data about the POIs and their respective locations in the POI records. The map database 108 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, construction activities, scheduled events, unscheduled events, etc.) associated with the POI data records or other records of the map database 108.

The map database 108 may be maintained by a content provider e.g., a map developer. By way of example, the map developer can collect geographic data to generate and enhance the map database 108. According to some embodiments, the map database 108 may delegate map generation and revision to other devices, such as mobile device 114. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used to generate map geometries directly or through machine learning as described herein.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by mobile device 114, for example. The navigation-related functions can correspond to vehicle navigation, pedestrian navigation, or other types of navigation. While example embodiments described herein generally relate to vehicular travel along roads, example embodiments may be implemented for pedestrian travel along walkways, bicycle travel along bike paths, boat travel along maritime navigational routes, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the server side map database 108 may be a master geographic database, but in alternate embodiments, a client side map database 108 may represent a compiled navigation database that may be used in or with end user devices (e.g., mobile device 114) to provide navigation and/or map-related functions. For example, the map database 108 may be used with the mobile device 114 to provide an end user with navigation features. In such a case, the map database 108 can be downloaded or stored on the end user device (mobile device 114) which can access the map database 108 through a wireless or wired connection, such as via a processing server 102 and/or the network 112, for example. Optionally, a portion of the map database 108, such map data regarding a specific roadway, may be downloaded or stored temporarily on an end user device, and according to various embodiments described herein, the mobile device 114 may be configured to modify the map data regarding a roadway before sending the map data back to the map database 108.

In one embodiment, the mobile device 114 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. A mobile device for navigation and map functions such as guidance and map display, for example, and for determination of one or more personalized routes or route segments based on one or more calculated and recorded routes, according to some example embodiments.

The processing server 102 may receive probe data from a mobile device 114 or a device in communication with mobile device 114. The mobile device 114 may include one or more detectors or sensors as a positioning system built or embedded into or within the interior of the mobile device 114. Alternatively, the mobile device 114 uses communications signals for position determination. The mobile device 114 may receive location data from a positioning system, such as a global positioning system (GPS), cellular tower location methods, access point communication fingerprinting, or the like. The server 102 may receive sensor data configured to describe a position of a mobile device, or a controller of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use the detectors and sensors to provide data indicating a location of a vehicle. This vehicle data, also referred to herein as "probe data", may be collected by any device capable of determining the necessary information, and providing the necessary information to a remote entity. The mobile device 114 is one example of a device that can function as a probe to collect probe data of a vehicle.

More specifically, probe data (e.g., collected by mobile device 114) is representative of the location of a vehicle at a respective point in time and may be collected while a vehicle is traveling along a route. While probe data is described herein as being vehicle probe data, example embodiments may be implemented with pedestrian probe data, marine vehicle probe data, or non-motorized vehicle probe data (e.g., from bicycles, skate boards, horseback, etc.). According to the example embodiment described below with the probe data being from motorized vehicles traveling along roadways, the probe data may include, without limitation, location data, (e.g. a latitudinal, longitudinal position, and/or height, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The mobile device 114, may be any device capable of collecting the aforementioned probe data. Some examples of the mobile device 114 may include specialized vehicle mapping equipment, navigational systems, mobile devices, such as phones or personal data assistants, or the like.

An example embodiment of a processing server 102 may be embodied in an apparatus as illustrated in FIG. 2. The apparatus, such as that shown in FIG. 2, may be specifically configured in accordance with an example embodiment of the present invention for incrementally updating map geometry based on real-time probe data. The apparatus may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor 202). The memory device may be configured to store information, data, content, applications, instructions, or the like, for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more mobile devices 114 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may, in turn, be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

Example embodiments of the present invention may provide a mechanism for route planning, and more particularly, to generation of a route from an origin to a destination factoring in the time dimension in order to optimize a route among a plurality of routes within the same network of roads. The use of the time dimension further facilitates avoidance of collisions between two routes that share intersections or road segments, as they can be designated to traverse such map features at different times. Embodiments create a load-balanced network of roads by adjusting routes according to the availability of nodes (e.g., intersections) within the network. Probe data feedback from vehicles enables refined route generation and re-routing, while routing instructions may be provided to autonomous vehicles, semi-autonomous vehicles, or non-autonomous vehicles.

Routing of vehicles and navigational assistance of vehicles is typically performed through the establishment of a destination, and determining a route to the destination from a current or selected location based on a current state of the traffic on the road network between the origin and destination. Routes may be generated based on an estimated travel time (e.g., selecting the lowest travel time), the most straightforward (e.g., fewest turns), the route including the most restricted-access freeways, etc. However, these approaches fail to consider traffic state changes during the journey, traffic congestion lessening during the journey, or other dynamic changes that may occur during a journey. Further, many people may be traveling to the same destination (e.g., to a vacation spot during Spring Break) and may each be assigned the same route, leading to future traffic issues as the best available or recommended route for all travelers may be the same at the time of selection.

Current routing solutions for finding the best route or a recommended route from an origin to a destination generally finds the shortest or fastest path between two arbitrary points within a road network. This results in generating the same route between the same or similar arbitrary points, and negatively affects the traffic congestion states as the number of similar routes increases. Some routing solutions may take into account the current congestion state of road segments along the route, such that congested areas may be avoided. Although this causes avoidance of areas that are congested at the time the route was generated, the route avoiding the congestion may be provided to numerous other vehicles, causing a congestion state along the alternative route. This route will continue to be the best alternative until the traffic congestion reaches a threshold above which the route is no longer the most desirable, and another route will then be established as the favored route to the destination. This reactive approach does not eliminate traffic congestion, but moves the congestion dynamically from route to route without considering the future state of the generated route.

Embodiments provided herein include an analysis mechanism that calculates the effect of current traffic and currently driven routes into future route plans. To this end, a three-dimensional analysis may be performed on the planned route to determine if the route is bound to result in congestion through the intersection with another route in the future (e.g., while the route is being driven). The third dimension of embodiments described herein is the time dimension, where nodes of a road network are represented by time-poles. The three-dimensional coordinate for each node becomes a latitude, longitude, and time combination that provides the ability to generate routes in time space to enable determining routes through nodes at times when they are available (e.g., not congested or not otherwise occupied). Embodiments may be used to ensure routes do not collide with one another such that congestion can be mitigated or eliminated altogether.

Embodiments described herein may use a map developer or map services provider 116 that functions as a router to generate routes from an origin to a destination through an extension of a routing algorithm, such as the Dijkstra multi-source-single-destination algorithm. The road network of a region that includes the origin and destination may be treated as a graph that is projected over a two-dimensional plane (x-y plane), which corresponds to a geographical map of the region. The graph may be extruded along the third dimension (z-axis) representing time such that the routes are generated through the three-dimensional time-space graph.

While routes determined or visualized on two-dimensional maps pass represent a path independent of time, embodiments described herein may be visualized as routes along a two dimensional path as viewed from above the road network, but ascending along the z-axis (time) orthogonal to the road network throughout their progression from the origin to the destination. The slope of the route's path may represent the reciprocal of the vehicle speed (change in time over the change in displacement) at each point along the route. As the vertical slope is related to progress in time, high route slopes equate to slower driving speeds at a specific segment (e.g., taller time over shorter distance), while low slopes represent faster vehicle speeds (e.g., shorter time over longer distance).

FIG. 3 illustrates an example embodiment of a map of a region 300 shown in a perspective view, where the map extends along the x-axis and y-axis illustrated by coordinate axes 310. As shown, a number of roadways are within the mapped region 300 including road 320 extending along the y-axis, road 330 extending along the x-axis, and a diagonal road 340 extending across the x-y plane. A route 355 is illustrated between origin 350 and destination 360 along a sequence of road segments and nodes (where the road segments meet). This two-dimensional representation shows how a person would travel or how a vehicle would drive from the origin 350 to the destination 360. Example embodiments described herein add a time component to the route.

FIG. 4 illustrates the map of a region 300 where the map extends along the x-axis and y-axis as shown in FIG. 3; however, a time component is added in the z-axis. The route 370 is depicted with a time component that illustrates when a user will be where on the route 370. The slope of the route 370 between the nodes: origin 350, 380, 390, and destination 360 represents the reciprocal of the speed, with time over a unit of measure, indicating how long it takes to traverse each road segment between the nodes. The time component, as time passes, can be thought of as a plane, parallel to the x-y plane, moving in the positive direction of the z-axis. As time progresses, the intersection between the plane and the route 370 provides a time and location of along the route 370. The location may be the location at which a driver is estimated or anticipated to be if they are traveling the route 370. The height of the route 370 destination 360 in the z-axis relative to the height of the route origin 350 is the total time estimated to drive the route.

Embodiments described herein go beyond conventional route planning to involve the time dimension to be a time-space router. This approach avoids generating congestion by using the presence of the time axis in a graph model to maintain a minimal time separation period between any two routes passing through any one graph node (e.g., an intersection). This is accomplished by shifting route intersection points upward, in the direction of the time axis, to a point where a suitable time window is available at an intersection. Availability at a node is where the node is not occupied by another vehicle or not anticipated to be occupied by another vehicle. In multi-lane intersections, availability may be based on whether there is availability for a vehicle in the node or intersection, which may already be occupied by a single vehicle, but has capacity for two vehicles. Fundamentally, availability is the availability for a vehicle to pass through the intersection substantially unimpeded. Thus, availability in a first direction does not necessarily impact availability in an opposite direction, but may affect availability in a perpendicular direction, such as when a traffic signal is green in a first direction, and red in a perpendicular direction.

By generating routes in the x-y plane for latitude and longitude, and shifting the route in the z-axis as time progresses, the time/location intersection of routes can be avoided or minimized, a feature not available in a two-dimensional route of latitude and longitude when two routes cross one another. At each node there is a time-pole that can represent the availability and occupancy of the node as described further below. Embodiments described herein produce routes that are scheduled to pass through any intersection (or node) in an interleaved manner, where the vehicles traversing these routes are at least a predefined amount of time apart, and effectively granted unimpeded access to the intersection, such as one vehicle at a time for every predetermined unit of time.

The predetermined period of time in which a vehicle occupies a node may be variable and may be based on the size of the intersection at the node, the road topology, road geometry (e.g., a wide road becoming a narrow street), traffic light duration, traffic control device type, maneuver complexity, vehicle parameters (e.g., size, weight, speed, etc.), vehicle type, driver history, etc. Each node and time-pole thereof may have a continuous window of time of which each generated route reserves a finite window for the vehicle traveling the route to traverse the node. Using a continuous window approach, there are no fixed windows for availability with defined start/stop times, or blocks of a predetermined duration that are reserved for routes, but instead a dynamic window of time that can be reserved within the time-pole of a node at any available time for any necessary duration.

The time-space router of example embodiments plans new routes according to the availability of time windows at each time-pole of each node along a potential route. As a new route is being planned, minimal time separation between any two routes passed through the same node. This may be practically enforced using dynamic alteration of graph edge weight based on a nearest possible time window within the time-pole of the next node processed through the routing algorithm, which may include, for example the Dijkstra algorithm. The graph edges represent road segments between nodes, and the weight of an edge can represent the desirability of the road segment or cost contribution of the respective road segment to an associated route. For example, the weight of an edge would be greater if the nearest possible time window within the next time-pole is relatively high in the time-axis direction, implying that the vehicle needs to drive slowly through the road segment corresponding to the edge to reach the intersection of the node at that late time. Hence, the road segment becomes less desirable and it increases the inefficiency or cost of the route that uses this edge. Through the weighting of edges within a route, other possible edges between nodes may become more desirable if they have lower weights, increasing the efficiency and decreasing the cost of the route by using lower weight edges associated with road segments leading to nodes with availability at lower points along their time-poles (e.g., available windows of time earlier in time).

The weights of edges (road segments) between nodes (intersections) may change based on the occupancy of the nodes linked by the edges rather than the occupancy of the road segments themselves. Weights applied to an edge may be based on the aggregate effect of all previously generated routes that include nodes that intersect the edges. A mechanism to deduce the weight of a graph edge or road segment may begin with finding the soonest available time window for the routed vehicle to pass through the next intersection or node from a source node. The soonest takes into account limitations, such as the maximum speed of a road segment, the limitations of a vehicle, etc. For example, an available time window that requires a vehicle to traverse a road segment at 75 miles per hour is not a viable time window if the road segment speed limit is 35 miles per hour. The farther out in time such a window is located (e.g., the higher along the z-axis of time), the higher the graph edge weight would be. This edge weight is considered when the routing algorithm processes the various routes using a routing algorithm such as the Dijkstra algorithm.

Routing algorithms, such as the Dijkstra algorithm, may be analogized with a helical tension spring. Initially, the cost of the shortest path is an overestimate, unlikely to finally be the shortest path, represented by the helical spring stretched out. As shorter paths are determined having lower costs, the estimated cost is lowered and the spring is relaxed. Eventually, the shortest path is found and the spring has been relaxed to its resting length. During route calculation and to complete the relaxation stage of route planning, each edge in that stage may store a reference for the time window used to calculate that edge's weight. Storing a reference is not equivalent to reserving the time window as a route found during the relaxation stage may not correspond to the shortest/lowest cost route, and it would be undesirable to tie up all nodes and edges of potential routes when only one route will eventually be chosen. It is only upon all graph nodes being processed and the shortest path found (with the relaxation complete) that the stored time window references, belonging to edges that are found in the shortest path to the destination, are flagged as reserved within their corresponding time-poles. Each calculated route affects the underlying three-dimensional graph through altering the possible costs of its edges in the third (time) dimension by occupying possible time windows of time-poles of nodes that become unavailable to subsequently calculated routes.

Upon establishing the best route, which may be, for example, the shortest path or lowest cost route, the time windows of each time-pole of each node become reserved for the anticipated time and time window in which the vehicle is anticipated to traverse each node. Subsequent routing attempts for other vehicles will recognize these reserved time windows and route accordingly, avoiding a collision of the routes through a node at the same time. Route aggregation keeps track of all routes and maintains aggregated routes and their effect on a road network. The effect of the plurality of routes is considered when creating a new route which will also contribute to the aggregated routes and the resultant effect on traffic and congestion.

As described above, each intersection or node includes and maintains its own time-pole which is a continuous axis from which time windows can be reserved during a route calculation. Windows of time in the past along each time-poll are discarded as they become irrelevant. The time-polls may be implemented as a binary tree object for their logarithmic range search properties described further below. Each time-pole is a registry object that maintains a list of the used time windows. Each window stores its starting time stamp and time duration.

FIG. 5 illustrates an example embodiment of the present invention providing visualizations of time-poles at each node. As shown, map 400 includes a series of roads 402, 404, 406, and 408, and provides an illustration of a z-axis 450 representing time extruded from the map 400. As shown, at each intersection or node there is a time-pole. Time pole 410 is shown at the intersection of roads 408 and 406, time pole 412 is at the node representing intersection of road 402 and 404, and time-pole 414 is depicted at the intersection of roads 402 and 406. Two routes 440 and 445 are also indicated, with route 440 starting along road 404 at time 0, and passing through the node represented by time-pole 412 at window 422, proceeding onto the intersection represented by time-pole 414 at window 424, before proceeding along road 406. The second route 445 begins along road 404 at about 10 minutes after the first route 440 did, and reaches the intersection node represented by time-pole 412 at window 432. This window is exclusive of window 422. Also note that there is availability between windows 422 and 432. The second route 445 proceeds along the same road segment as the first route 440 to the intersection represented by time-pole 414 at window 434, before turning left and advancing to the time-pole 410 at window 430.

Referring again to the Dijkstra algorithm for routing, due to the nature of this algorithm, the shortest path may be calculated from a destination point and updating the distance leading to that destination for all subsequent nodes within the graph. The introduced time reservations and subsequently their effect on the shortest distances may be made assuming that the node being processed is a source node, while the convention in Dijkstra treats the node as a destination. If this convention remains, the algorithm creates routes that increase in time from a destination to a source rather than the graph described herein in which time increases from the source to the destination. Maintaining the Dijkstra convention results in calculating a start time at the source node that is in the future since time increases while going through the poles from the destination to the source. To rectify this convention for purposes described herein, the graph edge directions need to be reversed such that all edges incident to a node become incident from that node, and all edges incident from a node become incident to that node. After that, the calculation starts from the source node instead of the destination node in Dijkstra's algorithm. This results in the time-related issues having the correct flow from source to destination. Finally, the obtained route is to be reversed in terms of the order of the nodes to restore the correct sequence while the time resulting values are kept unreversed. This way, this calculation results in a consistent time-space progression on the provided route level.

As the origin and destination for a route may not correspond to an existing node, nodes may be created for each of these points. This snaps the start and end points of a route to the road geometry graph and the origin/destination nodes may be dynamically injected within the graph (O(1) complexity, as clarified below). Start and end points may optionally always be newly introduced nodes such that Dijkstra algorithm treats all nodes uniformly, without the need to introduce special cases to handle the start/end of routes. As the origin and destination become real nodes, they each receive time-poles, too and are treated uniformly throughout the time window reservation process, resulting in that other vehicles which pass through a street while another vehicle is beginning at that time will need to have their time windows properly placed within the time-pole to avoid a collision. New time-poles created at origin and destination nodes as the nodes are created may be pre-populated with time windows representing established, granted routes that pass through the new nodes. This may be performed by opening time windows at the intersection of all routes going through the road segment on which the new node is formed and iterating over all remaining aggregated routes within the system. Upon completing the time-pole population for the new nodes, the departing vehicle which is being routed, needs to find a time window for itself on its own node's time pole in the same manner as finding a time window of an existing time-pole along the route. This may mean that a route may indicate that there is a wait to being the route until a time window is available to enter the road segment at the new node corresponding to the origin.

The implementation of example embodiments is critical within the time-space routing algorithm and used extensively within the highest repeated step of the Dijkstra algorithm. As such, it is beneficial to choose an implementation having the lowest possible runtime complexity. To that end, a custom binary RB tree object may be used for storing the time windows for logarithmic runtime complexity. Each window object may store a real (double) value corresponding to its time duration and looked up by a key value corresponding to the start time stamp (also double). The object may be initialized to have only one window with a start time stamp that equals the current system time and duration up to a maximum. Finding an available window in a time-pole may be interpreted as finding a stored window within the time-pole that starts before or at the desired window's start time, and has enough duration to cover for the one requested by the desired window's duration. Due to the use of a binary RB tree, this is a logarithmic complexity operation. If such a window is located, then it is broken down into two window nodes that would result from pinching the desired window through the found node window's time duration. Edge cases should be considered, such as pinching at the exact beginning and end of the node's window.

According to some embodiments, returning a handle for a reserved window may be returning an iterator to the RB tree node that could host the desired window (constant runtime complexity). Committing a previously obtained reservation handle may be done by applying the pinch logic described above to the iterator obtained at reservation time (either constant or logarithmic runtime complexity). Canceling a committed window may be analogous to "patching" the hole within the time-pole's time axis. This may be done by locating the range of window entries that the patch would cover and replacing them with a new window representing the patched constellation of all windows. Care should be taken to all possible main and edge cases. This may have either constant or logarithmic runtime complexity. To support fast trimming, the RB tree should have a method to get the key at the top root element, and if the cutoff value that is needed to trim (evict the cache under it) is higher than the root key, then the edge leading to the higher subtree is promoted to be the new root, and the lower subtree nodes are recycled. These lower subtree nodes are not deleted, but instance to be reused for newer windows are kept. This may result in a constant time for performing the trim operation, which promotes frequent triggering of this method when a time-pole is being accessed and efficiently controlling its capacity.

The runtime complexity for calculating a single route may be the result of scaling the runtime complexity of the algorithm (e.g., Dijkstra) implementation by the time-pole operations complexity, which if the aforementioned implementation was used, would result in log of average number of time windows at a time-pole object would have at any time. If an even distribution over the road network for end points of requested routes is assumed, the average runtime complexity would be:

$$O\left(\log_2\left(\frac{R}{n}\right)\right)$$

Where R is the number of routes (or vehicles) that the router is persisting their information at any time instance, and n is the number of graph nodes (time-poles). An implementation of Dijkstra may result in runtime complexity of:

$$O(E \log_2(n))$$

Where E is the number of graph edges, and n is the number of graph nodes. In this case, the overall expected routing complexity for the proposed router would be:

$$O\left(E\log_2(n)\log_2\left(\frac{R}{n}\right)\right)$$

In order for example embodiments to operate efficiently, some parameters need to be predefined as a design choice, specialized per entity (or category of entities), or deducted at runtime from other correlated parameters at a specific system run state. Such parameters may include a vehicle speed that is used to calculate the nearest arrival time at the next time-pole from which the next nearest possible time window is looked up within the time-pole object. This speed should be considered the lower of either street speed limit or a predefined maximum speed value for the vehicle. The maximum vehicle speed could be correlated to the type of street that it is passing through as a graph edge and the presence of other vehicles in the vicinity. Although the presence of other vehicles could result in performance degradation due to the need for iterating over other near routes within the time-space volume that are traversing that road segment (edge) within the same vicinity. The time window size used for looking for possible gaps within an intersection's time-pole during a relaxation phase of the algorithm could be a design choice, related to the destination type (class of roadway), related to the maneuver type, or the like. Maneuvers may include things such as transitioning from a road segment corresponding to a major street to a road segment corresponding to a minor street, or going from a road segment with a higher number of lanes to a road segment with a lower number of lanes, or vice versa. Other scenarios specific to the road network may be considered to determine the duration for which a vehicle should occupy an intersection.

As the time-space volume, such as that shown in FIG. 4, is represented as a three-dimensional model that treats routes as lines within the volume where the x-y plane is the physical map graph representation and the z-axis as time, some three-dimensional operations could be beneficial when applied. One such operation may be the introduction of a horizontal plane, perpendicular to the time axis. The route lines that intersect the horizontal plane would represent the physical two-dimensional coordinates (x and y) that all vehicles should exist at for the time represented by the intersection of the plane with the z-axis. This may be used to interpolate between some time boundaries within the time-space volume for finding prospected vehicle positions at any instance there. The resulting obtained vehicle positions can be used within server-side guidance operations for finding out how deviant is a reported vehicle position at a specific time stamp from the ideal time/space position, in order to issue corrective guidance notifications or recreate the route in severe deviation cases. Since the intersection calculation concept is a three-dimensional geometric operation, the execution could be delegated to run on a GPU (graphics processing unit) system for obtaining vehicle positions in parallel with other routing operations that could still be running on the CPU, which would result in a higher overall system throughput.

According to example implementations, for the system to operate in a closed loop, a corrective feedback mechanism may be implemented by periodically sampling vehicle positions, guiding throughout the granted routes, and—at extreme route deviation cases—recreate a more suitable route for the actual state. For that to be controlled, the system may be divided into two components: a time-space routing service and a guidance service.

A time-space routing service may be a central service accessible through a communications network, such as the internet. It may be run internally in an implementation of the routing methods described above, and may expose an interface that listens for routing requests through an attached communications network. Requests may contain source and destination coordinates for which a requester may be interested in obtaining a route for a specific time. Typically, routes are requested at the time the user wishes to begin the route. The service may use the time-space router implementation to calculate the route and send it back to the requester through the network interface. This service may also receive and service re-routing requests. Re-routing may occur if the guidance service (described below) detects a relatively big deviation from planned time-space position such that the needed speed to recover appears impractical.

Each created route may resemble a unique and precise path, for which if a vehicle adheres to the path, it will not contribute to creating any congestion along its path and will traverse the route as safely and efficiently as possible. However, this is the ideal case. Vehicles, particularly those driven by humans rather than autonomously, tend to deviate from planned paths due to unexpected events, particularly when it comes to committing to following up the time schedule of a path. Therefore, a guidance service may be used not only to guide the vehicle throughout the expected route maneuvers, but also to instruct the vehicle to alter its speed properly in order to adhere to the time/space schedule along the route plan. Such instructions may include, for example, "speed up to X miles per hour" or "slow to Y miles per hour" to maintain the time separation between route paths within the remote router's space-time volume model.

Since such guidance is dependent not only on the vehicle's granted route regardless of the overall persisted routes model, it does not have to be a central service. The guidance service could be performed by a separate system installed directly in a vehicle. Such local service may interface with an in-vehicle positioning system, such as a global positioning system, to read current position, snap or associate it to the granted route per the trip plan (from current coordinates to some arbitrary destination point reachable through the remote router's graph), identify upcoming maneuvers over the route and notify the driver about them, and the expected driving speed. In the case of excessive deviation from the scheduled route progress, either time or space deviation, the guidance service may report this status to the remote central time-space routing service, which in turn would cancel the whole route that the vehicle was granted and recreate a new route based on the reported actual coordinates of the vehicle. This new route would be calculated based on up-to-date persisted time-space within the router's internal model. Finally, this route may be passed back to the reporting guidance service, where the guidance could resume over the new route. When the original route was canceled, the windows of time reserved on time-poles of the nodes of that route may be released in favor of the new time windows of time-poles on the new route, which may be the same or different from the time-poles (and associated nodes) of the original route.

FIG. 6 illustrates a flowchart of a method according to an example embodiment of the present invention. It will be understood that each block of the flowchart and combination of blocks in the flowchart may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions that execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems that perform the specified functions, or combinations of special purpose hardware and computer instructions.

FIG. 6 illustrates a flowchart of a method according to an example embodiment of the present invention for generation of a route from an origin to a destination factoring in the time dimension in order to optimize a route among a plurality of routes within the same network of road, and in consideration of other routes of other vehicles along the same road network. As shown at 510, an indication of an origin and a destination are received. Potential routes from the origin to the destination are established, where each route includes a sequence of nodes with road segments there between at 520. At 530, it is determined, for each sequence of nodes, an anticipated time at which each node in the sequence would be reached by a vehicle traveling along the respective route. For each sequence of nodes, the availability of each node in the sequence at the anticipated time each node in the sequence would be reached is determined, as shown at 540. A recommended route is established at 550 between the origin and the destination according to the availability of each of the sequence of nodes in the sequence at the time each node in the sequence would be reached. An instruction is provided at 560 to follow the established route.

In an example embodiment, an apparatus for performing the method of FIG. 6 above may comprise a processor (e.g., the processor 202) configured to perform some or each of the operations (510-560) described above. The processor may, for example, be configured to perform the operations (510-560) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 510-560 may comprise, for example, the processor 202 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:
1. A mapping system comprising:
a memory comprising map data, wherein map data comprises a network of road segments and nodes between road segments; and
processing circuitry configured to:
receive an indication of an origin and a destination;
determine potential routes from the origin to the destination, wherein each route comprises a sequence of nodes with road segments in between;

determine, for each sequence of nodes, an anticipated time at which point each node in the sequence would be reached by a vehicle traveling along the respective route;

determine, for each sequence of nodes, the availability of each node in the sequence at the anticipated time each node in the sequence would be reached;

establish a recommended route between the origin and the destination according to the availability of each of the nodes in the sequence at the time each node in the sequence would be reached; and provide an instruction to follow the established recommended route.

2. The mapping system of claim 1, wherein the availability of a node comprises a window of time in which no vehicle is determined to or scheduled to occupy the node.

3. The mapping system of claim 2, wherein the window of time for a node is of a predetermined length, wherein the predetermined length is established based on one or more of road topology at the node, intersection topology at the node, traffic light duration of the node, traffic control device at the node, maneuver complexity of the established recommended route at the node, or vehicle specifications of a vehicle traveling along the established recommended route.

4. The mapping system of claim 2, wherein the processing circuitry is further configured to:
monitor availability of each node of the established recommended route;
determine, for at least one node, a change in the availability affecting the availability of the respective node in the sequence at the anticipated time the node would be reached; and
provide an instruction to either increase speed or decrease speed in response to the change in the availability of the respective node.

5. The mapping system of claim 1, wherein the processing circuitry is further configured to:
monitor progress of a vehicle along the established recommended route;
determine an estimated time of arrival at a next node in the sequence of nodes of the established recommended route based on vehicle information;
determine if the estimated time of arrival at a next node in the sequence of the established recommended route corresponds to the anticipated time for the corresponding node; and
provide an instruction to either increase speed or decrease speed in response to the estimated time of arrival at the next node not corresponding to the anticipated time for the corresponding node.

6. The mapping system of claim 1, wherein the processing circuitry is further configured to:
monitor availability of each node of the established recommended route;
determine, for at least one node, a change in the availability affecting the availability of the respective node in the sequence at the anticipated time the node would be reached;
determine potential routes from a current location to the destination, wherein each route comprises a sequence of nodes;
determine, for each sequence of nodes, an anticipated time at which point each node in the sequence would be reached;
determine, for each sequence of nodes, the availability of each node in the sequence at the anticipated time each node in the sequence would be reached;
establish a revised recommended route between the current location and the destination according to the availability of each of the nodes in the sequence at the time each node in the sequence would be reached; and
provide an instruction to follow the established revised recommended route.

7. The mapping system of claim 6, wherein the processing circuitry is further configured to, in response to establishing the revised recommended route from the current location to the destination, release a node that was in the recommended route between the origin and the destination but not in the revised recommended route between the current location and the destination to increase the availability of the node at the anticipated time the node in the sequence of the recommended route would have been reached.

8. The mapping system of claim 1, wherein the processing circuitry is further configured to:
cause a decrease in the availability of each node in the sequence of nodes of the recommended route between the origin and the destination at the anticipated time at which each node in the sequence would be reached.

9. The mapping system of claim 1, wherein the processing circuitry is configured to establish a recommended route between the origin and the destination according to the availability of each of the sequence of nodes in the sequence at the time each node in the sequence would be reached comprises processing circuitry configured to:
evaluate availability of each node in a sequence for a route; and
in response to a given node having no availability at the anticipated time the corresponding node would be reached, changing at least one node earlier in the sequence than the given node having no availability to a different node to at least one of:
change the anticipated time the given node would be reached to a time at which the node would have availability; or
avoid the given node.

10. An apparatus comprising at least one processor and at least one memory including computer program code, the at least one memory and computer program code configured to, with the processor, cause the apparatus to at least:
receive an indication of an origin and a destination;
determine potential routes from the origin to the destination, wherein each route comprises a sequence of nodes with road segments in between;
determine, for each sequence of nodes, an anticipated time at which point each node in the sequence would be reached by a vehicle traveling along the respective route;
determine, for each sequence of nodes, the availability of each node in the sequence at the anticipated time each node in the sequence would be reached;
establish a recommended route between the origin and the destination according to the availability of each of the nodes in the sequence at the time each node in the sequence would be reached; and
provide an instruction to follow the established recommended route.

11. The apparatus of claim 10, wherein the availability of a node comprises a window of time in which no vehicle is determined to or scheduled to occupy the node.

12. The apparatus of claim 11, wherein the window of time for a node is of a predetermined length, wherein the predetermined length is established based on one or more of road topology at the node, intersection topology at the node, traffic light duration of the node, traffic control device at the node, maneuver complexity of the established recommended route at the node, or vehicle specifications of a vehicle traveling along the established recommended route.

13. The apparatus of claim 11, wherein the apparatus is further caused to:
monitor availability of each node of the established recommended route;
determine, for at least one node, a change in the availability affecting the availability of the respective node in the sequence at the anticipated time the node would be reached; and
provide an instruction to either increase speed or decrease speed in response to the change in the availability of the respective node.

14. The apparatus of claim 10, wherein the apparatus is further caused to:
monitor progress of a vehicle along the established recommended route;
determine an estimated time of arrival at a next node in the sequence of nodes of the established recommended route based on vehicle information;
determine if the estimated time of arrival at a next node in the sequence of the established recommended route corresponds to the anticipated time for the corresponding node; and
provide an instruction to either increase speed or decrease speed in response to the estimated time of arrival at the next node not corresponding to the anticipated time for the corresponding node.

15. The apparatus of claim 10, wherein the apparatus is further caused to: monitor availability of each node of the established recommended route;
determine, for at least one node, a change in the availability affecting the availability of the respective node in the sequence at the anticipated time the node would be reached;
determine potential routes from a current location to the destination, wherein each route comprises a sequence of nodes;
determine, for each sequence of nodes, an anticipated time at which point each node in the sequence would be reached;
determine, for each sequence of nodes, the availability of each node in the sequence at the anticipated time each node in the sequence would be reached;
establish a revised recommended route between the current location and the destination according to the availability of each of the nodes in the sequence at the time each node in the sequence would be reached; and
provide an instruction to follow the established revised recommended route.

16. The apparatus of claim 15, wherein the apparatus is further caused to, in response to establishing a revised recommended route from the current location to the destination, release a node that was in the recommended route between the origin and the destination but not in the revised recommended route between the current location and the destination to increase the availability of the node at the anticipated time the node in the sequence of the recommended route would have been reached.

17. The apparatus of claim 10, wherein the apparatus is further caused to:
cause a decrease in the availability of each node in the sequence of nodes of the recommended route between the origin and the destination at the anticipated time at which each node in the sequence would be reached.

18. The apparatus of claim 10, wherein causing the apparatus to establish a recommended route between the origin and the destination according to the availability of each of the sequence of nodes in the sequence at the time each node in the sequence would be reached comprises causing the apparatus to:
evaluate availability of each node in a sequence for a route; and
in response to a given node having no availability at the anticipated time the corresponding node would be reached, changing at least one node earlier in the sequence than the given node having no availability to a different node to at least one of:
change the anticipated time the given node would be reached to a time at which the node would have availability; or
avoid the given node.

19. A method, executed by processing circuitry, comprising:
receiving an indication of an origin and a destination;
determining potential routes from the origin to the destination, wherein each route comprises a sequence of nodes with road segments in between;
determining, for each sequence of nodes, an anticipated time at which point each node in the sequence would be reached by a vehicle traveling along the respective route;
determining, for each sequence of nodes, the availability of each node in the sequence at the anticipated time each node in the sequence would be reached;
establishing a recommended route between the origin and the destination according to the availability of each of the nodes in the sequence at the time each node in the sequence would be reached; and
providing an instruction to follow the established recommended route.

20. The method of claim 19, wherein the availability of a node comprises a window of time in which no vehicle is determined to or scheduled to occupy the node.

21. The method of claim 20, wherein the window of time for a node is of a predetermined length, wherein the predetermined length is established based on one or more of road topology at the node, intersection topology at the node, traffic light duration of the node, traffic control device at the node, maneuver complexity of the established recommended route at the node, or vehicle specifications of a vehicle traveling along the established recommended route.

22. The method of claim 21, further comprising:
monitoring availability of each node of the established recommended route;
determining, for at least one node, a change in the availability affecting the availability of the respective node in the sequence at the anticipated time the node would be reached; and
providing an instruction to either increase speed or decrease speed in response to the change in the availability of the respective node.

23. The method of claim 19, further comprising:
monitoring progress of a vehicle along the established recommended route;
determining an estimated time of arrival at a next node in the sequence of nodes of the established recommended route based on vehicle information;
determining if the estimated time of arrival at a next node in the sequence of the established recommended route corresponds to the anticipated time for the corresponding node; and providing an instruction to either increase speed or decrease speed in response to the estimated time of arrival at the next node not corresponding to the anticipated time for the corresponding node.

24. The method of claim 19, further comprising:

monitoring availability of each node of the established recommended route;

determining, for at least one node, a change in the availability affecting the availability of the respective node in the sequence at the anticipated time the node would be reached;

determining potential routes from a current location to the destination, wherein each route comprises a sequence of nodes;

determining, for each sequence of nodes, an anticipated time at which point each node in the sequence would be reached;

determining, for each sequence of nodes, the availability of each node in the sequence at the anticipated time each node in the sequence would be reached;

establishing a revised recommended route between the current location and the destination according to the availability of each of the nodes in the sequence at the time each node in the sequence would be reached; and providing an instruction to follow the established revised recommended route.

25. The method of claim 24, further comprising, in response to establishing a revised recommended route from the current location to the destination, releasing a node that was in the recommended route between the origin and the destination but not in the revised recommended route between the current location and the destination to increase the availability of the node at the anticipated time the node in the sequence of the recommended route would have been reached.

26. The method of claim 19, further comprising:

causing a decrease in the availability of each node in the sequence of nodes of the recommended route between the origin and the destination at the anticipated time at which each node in the sequence would be reached.

27. The method of claim 19, wherein establishing a recommended route between the origin and the destination according to the availability of each of the sequence of nodes in the sequence at the time each node in the sequence would be reached comprises:

evaluating availability of each node in a sequence for a route; and in response to a given node having no availability at the anticipated time the corresponding node would be reached, changing at least one node earlier in the sequence than the given node having no availability to a different node to at least one of:

change the anticipated time the given node would be reached to a time at which the node would have availability; or avoid the given node.

* * * * *